(No Model.)
J. B. CHASE.
FASTENING FOR GLOVES, &c.
No. 437,750. Patented Oct. 7, 1890.
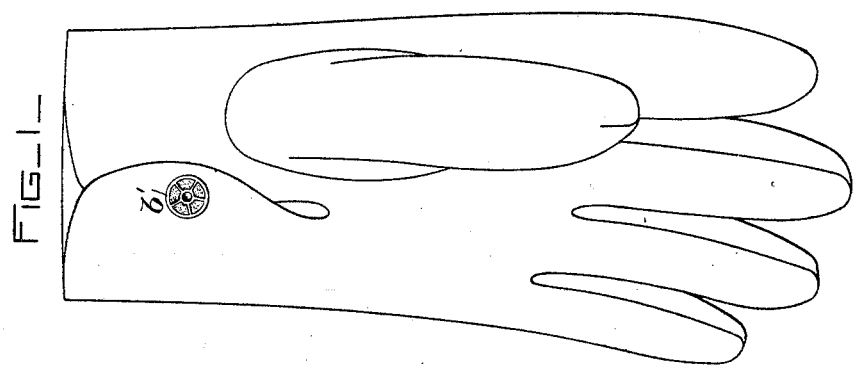
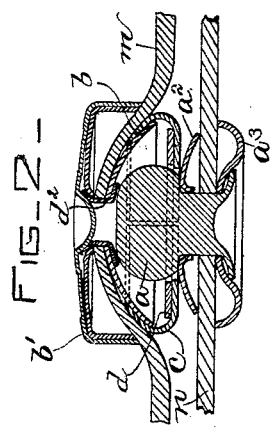
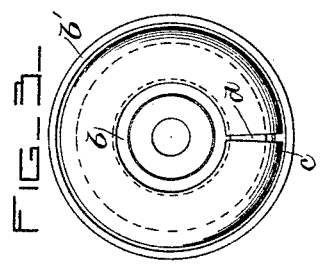
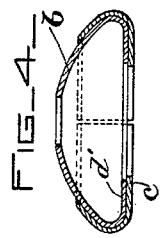
WITNESSES
Arthur S Davis
Frederick L Emery
INVENTOR
Josiah B. Chase,
by Lemby & Gregory

UNITED STATES PATENT OFFICE.

JOSIAH B. CHASE, OF NEWTON, MASSACHUSETTS.

FASTENING FOR GLOVES, &c.

SPECIFICATION forming part of Letters Patent No. 437,750, dated October 7, 1890.

Application filed February 3, 1890. Serial No. 338,994. (No model.)

*To all whom it may concern:*

Be it known that I, JOSIAH B. CHASE, of Newton, county of Middlesex, State of Massachusetts, have invented an Improvement in Fastening Devices for Gloves and other Articles, of which the following description, in connection with the accompanying drawings, is a specification, like letters on the drawings representing like parts.

This invention has for its object to construct a fastening device for gloves and other articles which may be cheaply made, is not cumbersome, and presents a smooth and finished appearance.

My invention is herein embodied in a fastening sometimes termed a "clasp-fastening" for securing together two pieces of material.

In accordance with this invention a ball or stud is attached to one piece of material, and the clasp to engage said ball or stud is composed of a saucer-shaped or concaved disk, to which a cap is attached, said disk and cap lying at opposite sides of the other piece of material. A split ring is arranged on or embraces the said disk, or it may be attached thereto, the central normally-contracted opening of which is a little smaller in diameter than the diameter of the ball or stud. The said saucer-shaped or concaved disk and split ring present a chamber to receive and hold the ball or stud. A washer or continuous ring is placed in the saucer-shaped or concaved disk back of the split ring, its function or purpose being to protect the said ring when subjected to too great strain, although, if desired, the said washer may be formed integral with the saucer-shaped or concaved disk, and thereby form the ball or stud receiving chamber.

Figure 1 shows in plan view a glove embodying this invention; Fig. 2, a vertical section of a fastening embodying this invention; Fig. 3, a plan view of the split ring to be referred to, and Fig. 4 a modification to be referred to.

The ball or stud $a$, preferably unslitted, is secured in place by suitable washers $a^2 a^3$, one at each side of the material $n$.

The clasp herein shown, and which comprehends the essence of this invention, consists of a saucer-shaped or concaved disk $b$, a split ring $c$ thereon, and a washer $d$.

The saucer-shaped or concaved disk $b$ may have a washer or button-shaped cap $b'$ secured to it by means of a rivet $d^2$ or other means, and the material $m$ is secured in place between said cap $b'$ and disk $b$.

The cap may be composed of two superimposed pieces, as shown in Fig. 2, or only one piece may be used, the two pieces, as herein shown, composing the cap $b'$.

The split ring $c$ is formed of sheet metal, and is herein shown as bent into suitable shape to embrace and hold itself firmly on the saucer-shaped or concaved disk $b$. The disk $b$ and split ring $c$ constitute a chamber or socket for the ball or stud. The central opening in the ring $c$ when normally contracted is somewhat less in diameter than the diameter of the ball or stud $a$, and the said ring $c$ is made spring-acting, so that when expanded by pressing the ball or stud through the said opening it will readily contract and hold the said ball or stud.

A continuous ring or washer $d$ may be placed in the chamber or socket formed by the saucer-shaped disk $b$ and split ring just back of said ring, the central opening of which washer is a little larger in diameter than the diameter of the opening in the split ring, it being large enough to permit the ball or stud $a$ to pass through it freely. The washer $d$ serves to protect the split ring from being unduly expanded by any strain that may be brought upon it by the ball.

One flap of the glove or garment is held in place between the washers $a^2 a^3$, and the other flap between the head or cap $b'$ and disk $b$.

Referring to Fig. 4, the disk $b$ and washer $d'$ are formed in a single piece and are embraced by the split ring $c$, which is properly bent, as shown, for such purpose.

I claim—

1. The fastening herein described, comprising a ball or stud, and a clasp composed of a concaved disk to receive and cover the ball or stud, and a spring-acting split ring formed of sheet metal and bent to embrace and hold itself on the said disk, the normal opening of said ring being less than the diameter of the ball or stud, and a cap or head $b'$, secured to said clasp, substantially as described.

2. The fastening herein described, comprising a ball or stud, a clasp composed of a concaved disk to receive the stud, a split ring formed of sheet metal and bent about and embracing said disk, and a non-expansive washer, as $d$, back of said ring and held within the disk, and a cap $b'$, attached to the disk, substantially as described.

In testimony whereof I have signed my name to this specification in the presence of two subscribing witnesses.

JOSIAH B. CHASE.

Witnesses:
GEO. W. GREGORY,
FREDERICK L. EMERY.